United States Patent [19]
Yokose et al.

[11] Patent Number: 5,828,789
[45] Date of Patent: Oct. 27, 1998

[54] IMAGE CODING SYSTEM AND IMAGE DECODING SYSTEM

[75] Inventors: Taro Yokose; Shuichi Kimura; Yutaka Koshi; Koh Kamizawa; Kenichi Kawauchi, all of Ashigarakami-gun, Japan

[73] Assignee: Fuji Xerox Co., Ltd., Tokyo, Japan

[21] Appl. No.: 729,371

[22] Filed: Oct. 17, 1996

[30] Foreign Application Priority Data

Feb. 19, 1996 [JP] Japan ................................ 8-031074

[51] Int. Cl.$^6$ ........................................ G06K 9/00
[52] U.S. Cl. ................................. 382/239; 382/238
[58] Field of Search ........................... 348/405, 401, 348/420, 416, 699, 157, 222, 399, 26, 415; 375/241; 368/9; 382/238, 240, 241, 107, 197, 199, 155, 156, 159, 160, 168, 170, 181, 190, 192, 209, 217, 224, 227, 228, 232, 233, 235, 236, 239, 243, 244, 248, 251, 252, 276, 307, 308

[56] References Cited

U.S. PATENT DOCUMENTS

| | | | |
|---|---|---|---|
| 4,816,914 | 3/1989 | Ericsson | 358/133 |
| 5,347,309 | 9/1994 | Takahashi | 348/401 |
| 5,379,355 | 1/1995 | Allen | 382/56 |
| 5,512,952 | 4/1996 | Iwamura | 348/416 |
| 5,552,824 | 9/1996 | Deangelis et al. | 348/157 |
| 5,592,228 | 1/1997 | Dachiku et al. | 348/416 |
| 5,646,691 | 7/1997 | Yokoyama | 348/416 |

OTHER PUBLICATIONS

"Multimedia fugoukanokokusaihyooujyun" (International Standard for multimedia coding), (1991), Hiroshi Yasuda, pp. 28–33. (No Place of Publication).

"Postscript References Manual Second Edition", Abode Systems, ASCII, pp. 168–169. No Author. No Place of Publication. No Date.

*Primary Examiner*—Leo Boudreau
*Assistant Examiner*—Bijan Tadayon
*Attorney, Agent, or Firm*—Oliff & Berridge, PLC

[57] ABSTRACT

In a coding system, when any of the prediction results of pixel value prediction sections 20 and 21 matches an object pixel, a coding section 50 codes an identifier of the pixel value prediction section whose prediction result matches the object pixel. When none of the results match the object pixel, the coding section 50 codes a prediction error of a prediction error calculation section 30. A decoding system decodes code to an identifier or prediction error and outputs pixel data from the corresponding pixel value prediction section based on the identifier or takes out pixel data from a prediction error addition section 31 based on the predication error.

25 Claims, 17 Drawing Sheets

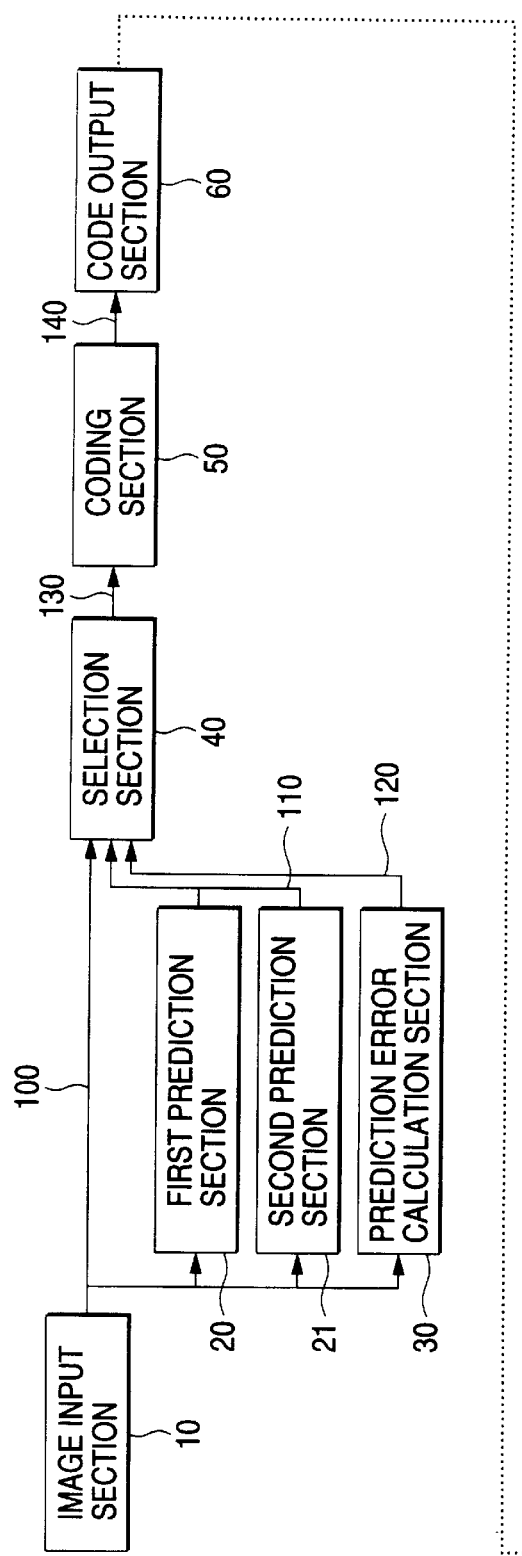
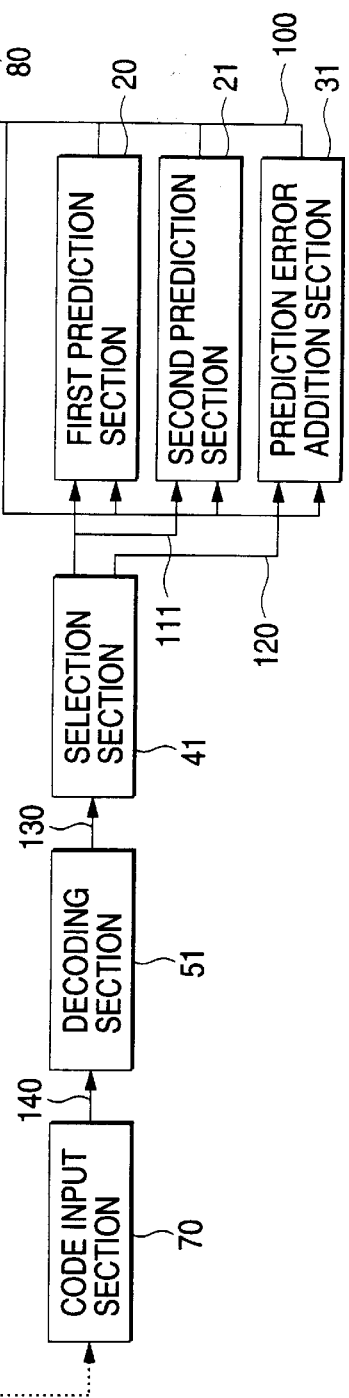
FIG. 1A
FIG. 1B

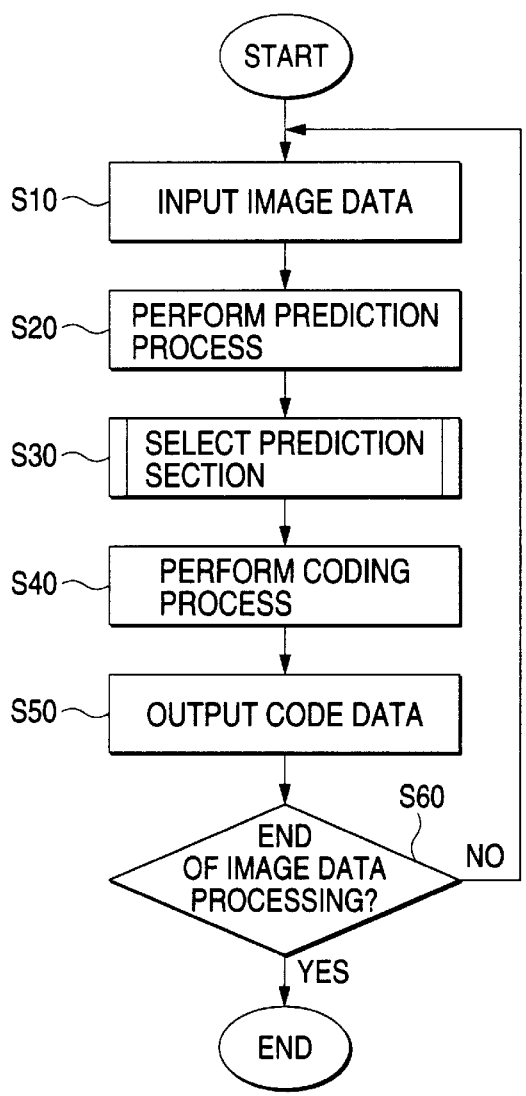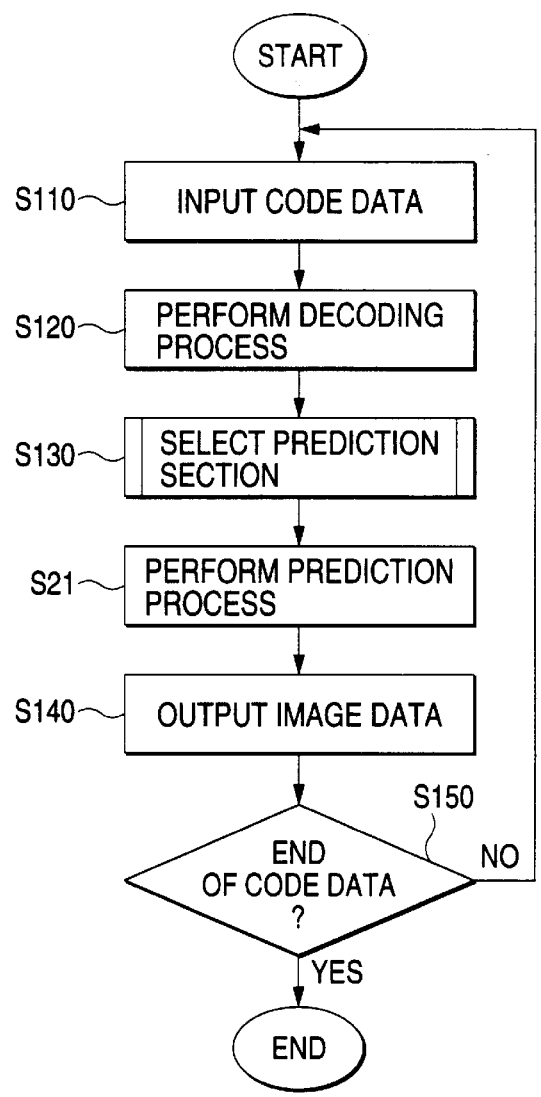

FIG. 4A
FIG. 4B
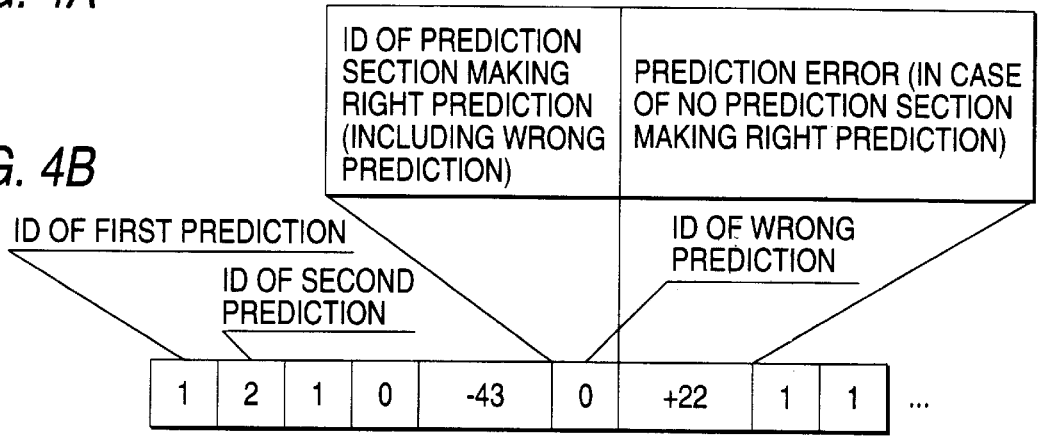
FIG. 4C
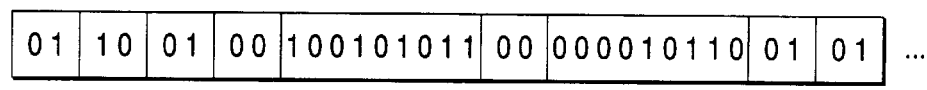
FIG. 4D
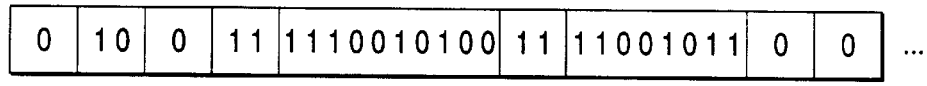
FIG. 4E
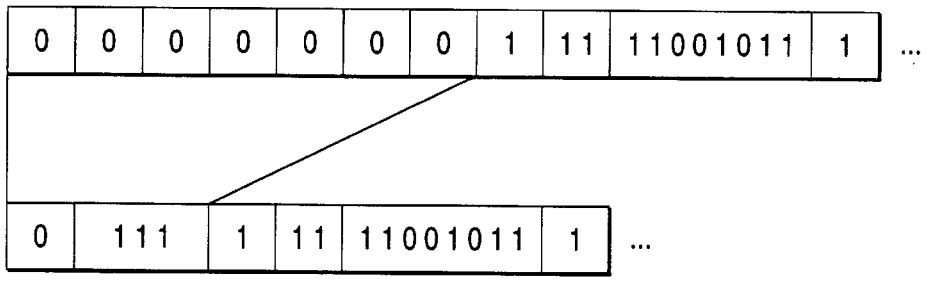

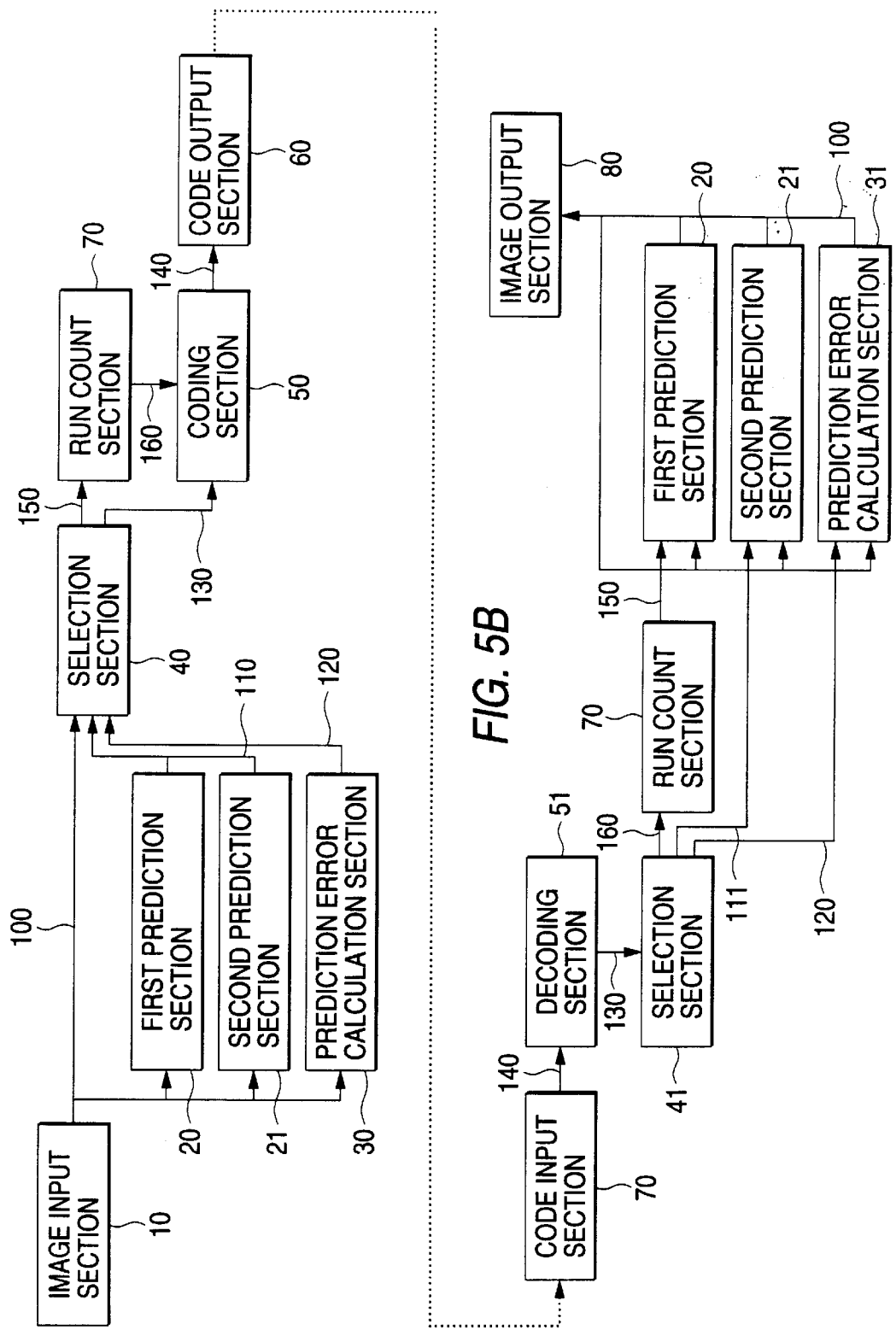

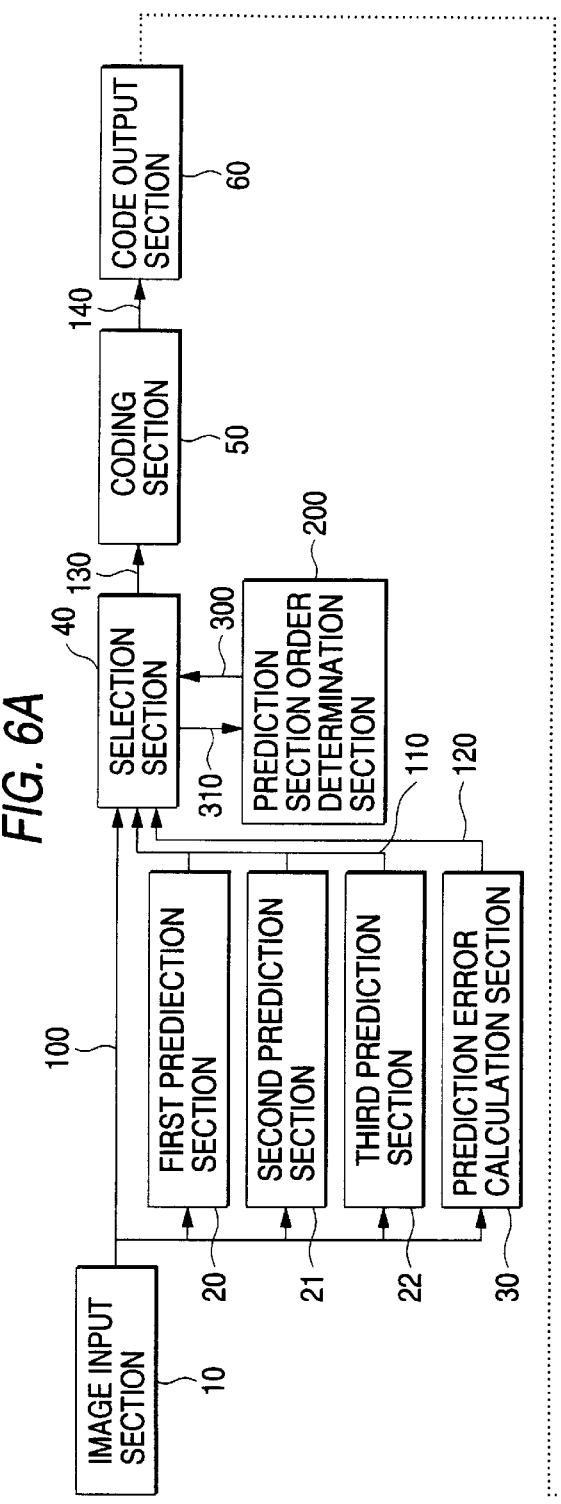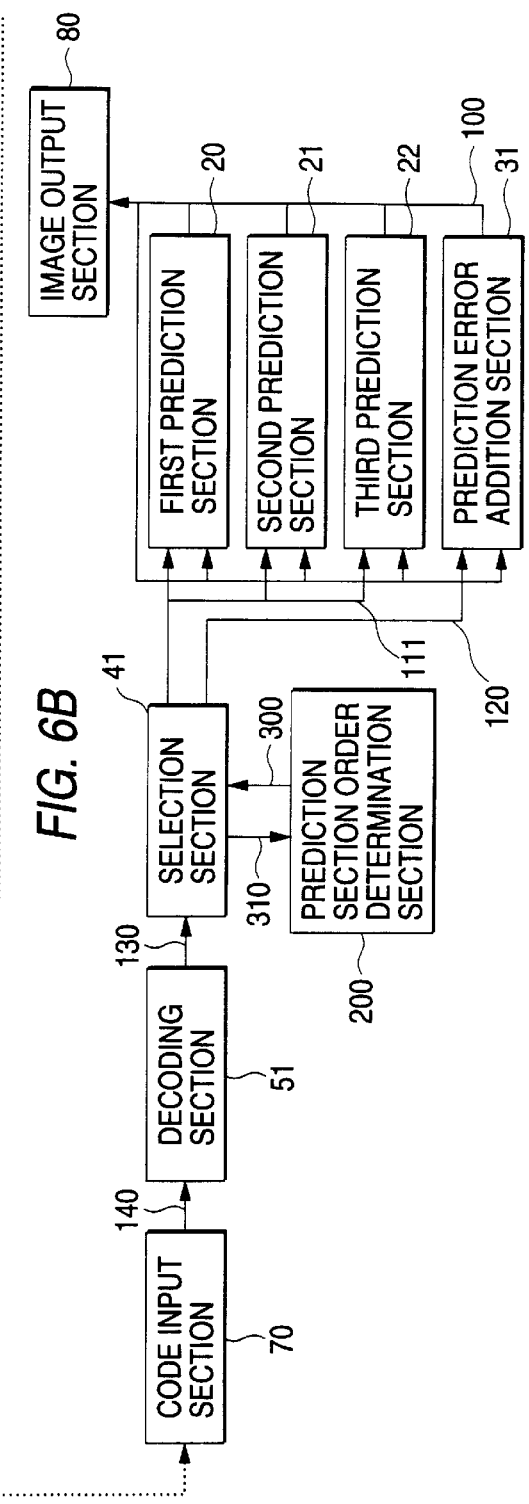

FIG. 9A

| PREDICTION SECTION | SUM OF ABSOLUTE VALUES OF PREDICTION ERRORS | PREDICITON ORDER |
|---|---|---|
| FIRST PREDICTION SECTION | 10 | 1 |
| SECOND PREDICTION SECTION | 17 | 2 |
| THIRD PREDICTION SECTION | 100 | 3 |

FIG. 9B

| PREDICTION SECTION | PREDICITON ORDER |
|---|---|
| FIRST PREDICTION SECTION | 1 |
| SECOND PREDICTION SECTION | 2 |
| THIRD PREDICTION SECTION | 3 |

FIG. 9C

| PREDICTION SECTION | PREDICITON ERROR |
|---|---|
| FIRST PREDICTION SECTION | 10 |
| SECOND PREDICTION SECTION | 0 |
| THIRD PREDICTION SECTION | -8 |

FIG. 9D

| PREDICTION SECTION | SUM OF ABSOLUTE VALUES OF PREDICTION ERRORS | PREDICITON ORDER |
|---|---|---|
| FIRST PREDICTION SECTION | 20 | 2 |
| SECOND PREDICTION SECTION | 17 | 1 |
| THIRD PREDICTION SECTION | 108 | 3 |

FIG. 11

| PREDICTION ORDER PATTERN NO. | PREDICTION ORDER PATTERN | | | | NEXT PREDICTION ORDER PATTERN NO. | | | |
|---|---|---|---|---|---|---|---|---|
| | FIRST-ORDERED | SECOND-ORDERED | THIRD-ORDERED | FOURTH-ORDERED | FIRST | SECOND | THIRD | FOURTH |
| 0 | FIRST | SECOND | THIRD | FOURTH | 0 | 6 | 12 | 18 |
| 1 | FIRST | SECOND | FOURTH | THIRD | 1 | 7 | 12 | 18 |
| 2 | FIRST | THIRD | SECOND | FOURTH | 2 | 6 | 12 | 19 |
| 3 | FIRST | THIRD | FOURTH | SECOND | 3 | 6 | 13 | 19 |
| 4 | FIRST | FOURTH | SECOND | THIRD | 4 | 7 | 13 | 18 |
| 5 | FIRST | FOURTH | THIRD | SECOND | 5 | 7 | 13 | 19 |
| 6 | SECOND | FIRST | THIRD | FOURTH | 0 | 6 | 14 | 20 |
| 7 | SECOND | FIRST | FOURHT | THIRD | 1 | 7 | 14 | 20 |
| 8 | SECOND | THIRD | FIRST | FOURTH | 0 | 8 | 14 | 21 |
| 9 | SECOND | THIRD | FOURTH | FIRST | 0 | 9 | 15 | 21 |
| 10 | SECOND | FOURTH | FIRST | THIRD | 1 | 10 | 15 | 20 |
| 11 | SECOND | FOURTH | THIRD | FIRST | 1 | 11 | 15 | 21 |
| 12 | THIRD | FIRST | SECOND | FOURTH | 2 | 8 | 12 | 22 |
| 13 | THIRD | FIRST | FOURTH | SECOND | 3 | 8 | 13 | 22 |
| 14 | THIRD | SECOND | FIRST | FOURTH | 2 | 8 | 14 | 23 |
| 15 | THIRD | SECOND | FOURTH | FIRST | 2 | 9 | 15 | 23 |
| 16 | THIRD | FOURTH | FIRST | SECOND | 3 | 9 | 16 | 22 |
| 17 | THIRD | FOURTH | SECOND | FIRST | 3 | 9 | 17 | 23 |
| 18 | FOURTH | FIRST | SECOND | THIRD | 4 | 10 | 16 | 18 |
| 19 | FOURTH | FIRST | THIRD | SECOND | 5 | 10 | 16 | 19 |
| 20 | FOURTH | SECOND | FIRST | THIRD | 4 | 10 | 17 | 20 |
| 21 | FOURTH | SECOND | THIRD | FIRST | 4 | 11 | 17 | 21 |
| 22 | FOURTH | THIRD | FIRST | SECOND | 5 | 11 | 16 | 22 |
| 23 | FOURTH | THIRD | SECOND | FIRST | 5 | 11 | 17 | 23 |

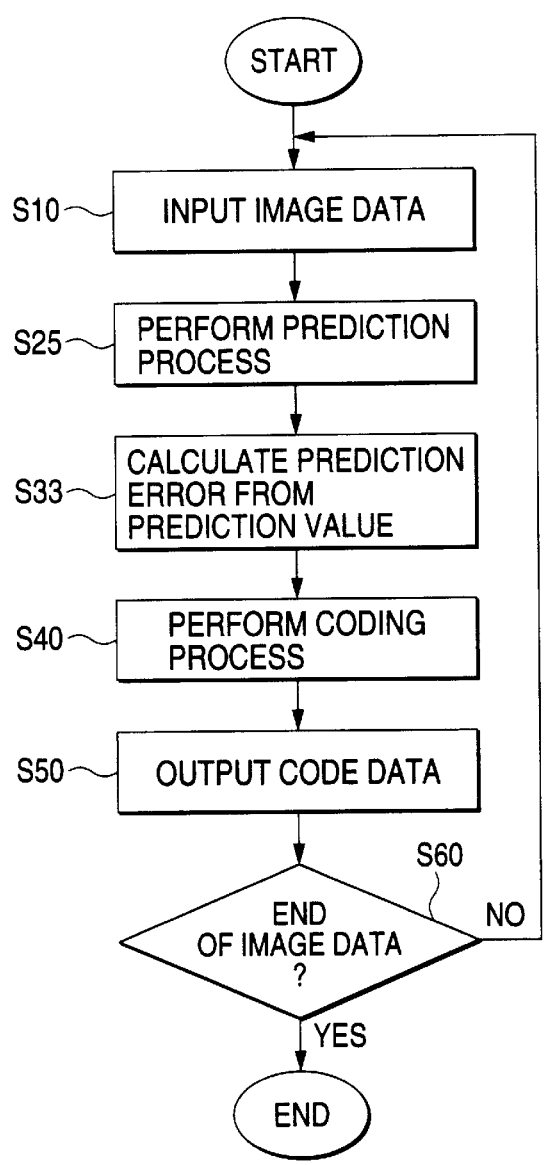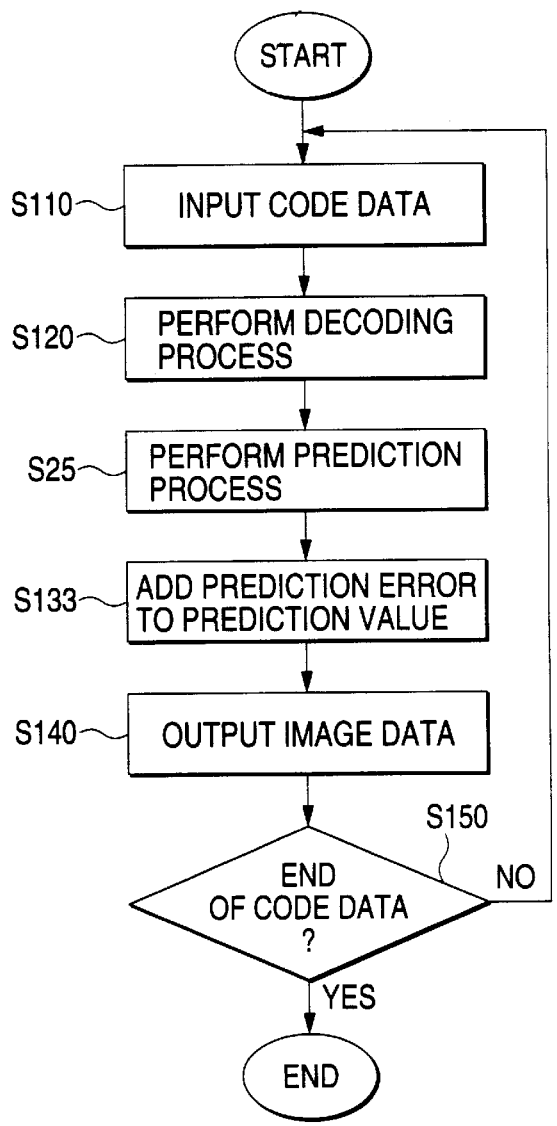

IMAGE CODING SYSTEM AND IMAGE DECODING SYSTEM

BACKGROUND OF THE INVENTION

1. Field of the Invention

This invention relates to an image coding technology and in particular to reversible coding of a continuous-tone input image.

2. Description of the Related Art

Since an image generally involves an extremely large amount of data, generally it is coded for compression at storage or transmission. Image data coding techniques are roughly classified into a lossless coding method and a lossy coding method. The latter method can cause a decoded image to visually degrade depending on the compression rate.

In recent years, computer-prepared images typified by images described in PDLs (page description languages), which will be hereinafter collectively called CG images, have increased. These images do not contain a noise component at the scan time as compared with the conventional scanned-in images, thus image quality degradation caused by lossy coding is very obtrusive at edges, etc.

For example, in lossy coding called a base line process defined in JPEG (joint photographic experts group), image coding standard, DCT (discrete cosine transform) is used to convert an image into frequency components before quantization is executed. This technique is effective for a scan-in image with energy centering around low-frequency component, but causes a decoded image to degrade in quality for CG images where high-frequency component also much occurs. Mosquito noise occurring in the vicinity of edges and block noise occurring at block joints are as examples of image quality degradation.

According to lossless coding for providing the same image as input as a decoded image, the image quality degradation problem can be circumvented. As an example of the conventional lossless coding, a spatial system defined in JPEG, which will be hereinafter simply called JPEG, will be discussed below:

FIGS. 13A and 13B show configuration examples of a coding system and a decoding system for implementing JPEG. Some correction is added to FIG. 1.10 in "Multimedia fugoukanokokusaihyoujyun" (International standard for multimedia coding) (edited and written by YASUDA Hiroshi, Maruzen, p.28) to match the purpose of the invention. In FIGS. 13A and 13B, numeral reference 10 denotes an image input section, numeral 25 is a prediction section, numeral 35 is a prediction error calculation section, numeral 36 is a prediction error addition section, numeral 50 is a coding section, numeral 51 is a decoding section, numeral 60 is a code output section, numeral 70 is a code input section, numeral 80 is an image output section, numeral 100 is image data, numeral 110 is predication value data, numeral 120 is prediction error data, and numeral 140 is code data.

The respective components of FIGS. 13A and 13B will be discussed. The coding system in FIG. 13A has the following configuration: The image input section 10 receives an input image from an external system and sends the input image to the prediction section 25 and the prediction error calculation section 35 as the image data 100. The prediction section 25 predicts the pixel value of an object pixel by a predetermined method from the received image data and sends the pixel value to the prediction error calculation section 35 as the prediction value data 110. The prediction error calculation section 35 subtracts the prediction value data 110 from the actual pixel value of the object pixel given as the image data 100 and sends the subtraction result to the coding section 50 as the prediction error data 120. The coding section 50 uses a predetermined coding technique to code the prediction error data 120 and sends the coded data to the code output section 60 as the code data 140. The code output section 60 outputs the code data 140 to an external system as output code.

Next, the parts of the coding system in FIG. 13B will be discussed. Parts similar to those previously described with reference to FIG. 13A are denoted by the same reference numerals in FIG. 13B and will not be discussed again. The code input section 70 receives input code from an external system and sends the input code to the decoding section 51 as the code data 140. The decoding section 51 decodes the code data 140 by the decoding technique corresponding to the coding technique used with the coding section 60 and sends the decoded data to the prediction error addition section 36 as the prediction error data 120. The prediction error addition section 36 adds the prediction error 120 to the prediction value data 110 predicted by the prediction section 25 and sends the addition result to the image output section 80 as the image data 100.

The operation based on the configuration will be discussed. FIGS. 14A and 14B are flowcharts to explain the operation of the coding system and the decoding system in FIGS. 13A and 13B.

First, coding processing will be discussed with reference to FIG. 14A. At step S10, the image input section 10 inputs an image and provides image data 100. At step S25, the prediction section 25 predicts the pixel value of an object pixel based on the image data 100 and provides prediction value data 110.

At step S33, the prediction error calculation section 35 subtracts the prediction value provided at step S25 from the actual pixel value of the object pixel contained in the image data 100 and provides prediction error data 120. At step S40, the coding section 50 codes the prediction error data 120 by a predetermined coding technique and provides code data 140. At step S50, the code output section 60 outputs the code data 140 to an external system. At step S60, whether the input image data has been all processed is determined. If all the input image data has been processed, the coding processing is terminated. If unprocessed data remains, control returns to step S10.

Next, decoding processing will be discussed with reference to FIG. 14B. At step S110, the code input section 70 inputs code and provides code data 140. At step S120, the decoding section 51 provides prediction error data 120 from the code data 140 by the decoding technique corresponding to the coding technique used with the coding section 50. Step S25 is the same as step S25 in the decoding processing discussed above. At step S133, the prediction error addition section 36 adds the prediction error data 120 to the prediction data 110 and provides image data 100. At step S140, the image output section 80 outputs the image data 100 to an external system. At step S150, whether the input code data has been all processed is determined. If all the input code data has been processed, the decoding processing is terminated. If unprocessed data remains, control returns to step S110.

The coding process at step S40 and the decoding process at step S120 are performed by Huffman coding or arithmetic coding comprising multivalue-binary-value conversion.

Seven prediction expressions shown in FIG. 15 are provided for the prediction process and can be selected.

Next, the features of CG images will be discussed. For example, for PostScript, one of PDLs, the following description is made in "PostScript Reference Manual Second Edition" (Adobe Systems, ASCII, p.168): "Drawing in PostScript is performed as if it were painted with opaque paint. This is called paint model." Although other PDLs are available, the paint model is general under the present circumstances. Since drawing is performed with multiple coats of paint in the paint model, continuous pixels often have the same pixel value. General CG images, which are more flexible in model, are hard to be similar to PDL images. Since CG images do not involve scan noise, the possibility that pixels having the same pixel value may exist in the surroundings is high as compared with scan-in images.

In summary, the CG images have the following features as compared with scan-in images:
1) Pixel value change at edges is abrupt.
2) Information amount on LSB side is smaller than that of scan-in image.
3) Used pixel values often lean to specific values.
4) Area filling with the same pattern is frequently used.
5) Often the same pixel value exist in contiguous pixels.

Since the contiguous pixels often have the same pixel value in CG images, prediction errors of prediction with contiguous pixel values often become 0. In contrast, the JPEG, which assumes scan-in image originally, is designed on the precondition that an error occurs in prediction. That is, it is assumed that a prediction error distribution decreases continuously and monotonically with 0 as the vertex, and coding is also designed matching the model. Thus, if a prediction error often becomes 0, efficient compression cannot be executed. To code a prediction error, JPEG code bit allocation is not optimum for CG images having the above-described features.

If a pixel has the same pixel value as a contiguous pixel, their pixel position relationship is not constant. For example, all contiguous pixels have the same pixel value in a portion in which pixel value change is flat; if a thin line, etc., is drawn, only pixels having a specific positional relationship have the same pixel value. Therefore, to make a right prediction, preferably the position of a pixel to which a prediction is applied, namely, a prediction expression can be selected adaptively. In contrast, the JPEG uses the first selected prediction expression fixedly, thus a condition occurs in which prediction errors must also be coded for pixels whose pixel values can be predicted with no error if adaptive predictions are applied, increasing the code amount.

FIG. 16 shows the results of pixel value predictions made for three images described in PostScript and three scan-in images as an experiment example verifying the nature differences for predictions. Each black dot is the rate of prediction error 0 as a result of prediction with the immediately left pixel (pixel a in FIG. 15). Each white dot is the rate of prediction error 0 as a result of any of four predictions with four contiguous pixels (pixels a, b, c, and d in FIG. 15). Every result indicates that the PostScript images provide obviously a high rate. Particularly, the rate at which any of four predictions results in prediction error 0 in the PostScript images is almost 100%.

FIG. 17 shows the experiment results of occurrence rate distributions of prediction errors resulting from immediately left pixel predictions. Black dots and white dots are prediction error rate distributions of scan-in images and PostScript images. The heavy line denotes the reciprocal of bit allocation in JPEG Huffman code. Therefore, the closer the prediction error rate distribution to the heavy line, the higher the compression rate. As seen in FIG. 17, bit allocation in JPEG is more appropriate for the scan-in images than for the PostScript images.

SUMMARY OF THE INVENTION

It is therefore an object of the invention to provide a reversible coding system and decoding system high in compression rate for computer-prepared images including images described in PDLs.

To solve the above problem, according to a first aspect of the invention, there is provided an image coding system comprising means for inputting an image a plurality of pixel value prediction means for predicting a pixel value of an object pixel to be coded in the image input through the image input means by different prediction techniques, prediction error calculation means for calculating an error between the pixel value of an object pixel to be coded in the image input through the image input means and a prediction value predicted by a predetermined prediction technique, match determination means for determining whether or not the pixel value predicted by each of the pixel value prediction means matches the pixel value of the object pixel, selection means being responsive to determination output of the match determination means for selecting identification information for identifying the pixel value prediction means whose prediction pixel value is determined to match the pixel value of the object pixel by the match determination means or the error calculated by the prediction error calculation means, means for coding the identification information or error output by the selection means, and means for outputting code generated by the coding means.

According to a second aspect of the invention, there is provided an image decoding system comprising means for inputting code, means for decoding the code input through the code input means, a plurality of pixel value prediction means for predicting a pixel value of an object pixel to be decoded in an image by different prediction techniques, thereby calculating the pixel value of the object pixel, prediction error addition means for adding an error decoded by the decoding means and a prediction value predicted by a predetermined prediction technique, thereby calculating the pixel value of the object pixel in the image, selection means being responsive to information decoded by the decoding means for selecting any of the pixel value prediction means or the prediction error addition means, and object pixel output means, if one of the pixel value prediction means is selected by the selection means, for outputting the pixel value of the object pixel calculated by the selected pixel value prediction means, if the prediction error addition means is selected by the selection means, for outputting the pixel value of the object pixel calculated by the selected prediction error addition means.

According to a third aspect of the invention, there is provided an image decoding system comprising means for inputting an image, a plurality of coding pixel value prediction means for predicting a pixel value of an object pixel to be coded in the image input through the image input means by different prediction techniques, prediction error calculation means for calculating an error between the pixel value of an object pixel to be coded in the image input through the image input means and a prediction value predicted by a predetermined prediction technique, match determination means for determining whether or not the pixel value predicted by each of the coding pixel value prediction means matches the pixel value of the object pixel, coding selection means being responsive to determination output of the match determination means for selecting identification information for identifying the coding pixel value prediction means whose prediction pixel value is determined to match the pixel value of the object pixel by the match determination means or the error calculated by the prediction error calculation means, means for coding the identification information or error output by the coding selection means, means for outputting code generated by the coding means, means for storing the code output by the output means, means for inputting the code stored in the storage means, means for decoding the code input through the code input means, a plurality of decoding pixel value prediction means for predicting a pixel value of an object pixel to be decoded in an image by different prediction techniques, thereby calculating the pixel value of the object pixel, prediction error addition means for adding an error decoded by the decoding means and a prediction value predicted by a predetermined prediction technique, thereby calculating the pixel value of the object pixel in the image, selection means being responsive to identification information and an error decoded by the decoding means for selecting any of the decoding pixel value prediction means or the prediction error addition means, and object pixel output means, if one of the decoding pixel value prediction means is selected by the decoding selection means, for outputting the pixel value of the object pixel calculated by the selected decoding pixel value prediction means, if the prediction error addition means is selected by the decoding selection means, for outputting the pixel value of the object pixel calculated by the selected prediction error addition means.

According to the invention, when the prediction error becomes 0, the identification information of the pixel value prediction means rather than the prediction error is used and is coded, thus a high compression rate can be provided in images high in prediction hit rate like CG images as compared with the case of former fixed prediction error coding.

The image coding system may further include prediction order determination means for ordering the pixel value prediction means based on a history of predictions made by the plurality of pixel value prediction means, wherein the selection means may output the identification information of the pixel value prediction means represented by the order assigned by the prediction order determination means. In the image decoding system, in response to the identification information of the pixel value prediction means represented by the order assigned by the prediction order determination means, the pixel value prediction means may be selected for decoding. In doing so, adaptive coding can be realized.

The image coding system may further include prediction order determination means for ordering the pixel value prediction means and the prediction error calculation means based on a history of predictions made by the pixel value prediction means, wherein the selection means may output the identification information of the pixel value prediction means and the prediction error calculation means represented by the order assigned by the prediction order determination means. In the image decoding system, in response to the identification information of the pixel value prediction means and the prediction error calculation means represented by the order assigned by the prediction order determination means, the pixel value prediction means or the prediction error calculation means may be selected for decoding. In doing so, more efficiently adaptive coding can be realized.

In the invention, the prediction order determination means may order the pixel value prediction means based on the number of times each of the pixel value prediction means has made a right prediction.

In the invention, the prediction order determination means may order the pixel value prediction means based on a history of right predictions made by the pixel value prediction means within a recent predetermined period.

In the image coding system, only when the pixel value prediction means whose prediction pixel value matches the pixel value of the object pixel is assigned a predetermined high order by the prediction order determination means, the selection means may select the identification information of the pixel value prediction means, and when the pixel value prediction means whose prediction pixel value matches the pixel value of the object pixel is assigned an order lower than the predetermined high order by the prediction order determination means, the selection means may select the error calculated by the prediction error calculation means. In the image decoding system, the selection means may select means based on only a predetermined high order after ordering is performed by the prediction order determination means. In doing so, identification information code can be shortened.

In the image coding system, the coding means may perform coding based on the number of times of identification information selected consecutively by the selection means. The image decoding system may decode the coded data based on the number of times the pixel value prediction means has been consecutively selected by the selection means. In doing so, the compression rate can be furthermore improved.

The above and other objects and features of the present invention will be more apparent from the following description taken in conjunction with the accompanying drawings.

BRIEF DESCRIPTION OF THE DRAWINGS

FIGS. 1A and 1B are block diagrams showing an image coding-decoding system according to a first embodiment of the invention;

FIGS. 2A and 2B are flowcharts showing an example of the operation of coding-decoding processing in the image coding-decoding system of the first embodiment of the invention;

FIGS. 4A to 4E are illustrations of data in the image coding-decoding system of the first embodiment of the invention;

FIGS. 5A and 5B are block diagrams showing a modification of the image coding-decoding system according to the first embodiment of the invention;

FIGS. 6A and 6B are block diagrams showing an image coding-decoding system according to a second embodiment of the invention;

FIGS. 9A to 9D are conceptual drawings showing a memory and data in the image coding-decoding system of the second embodiment of the invention;

FIG. 11 is an illustration showing an example of a table used for ordering prediction sections in the second embodiment of the image coding-decoding system of the invention;

FIGS. 14A and 14B are flowcharts showing an example of the operation of coding-decoding processing in the conventional reversible image coding-decoding system;

DETAILED DESCRIPTION OF THE PREFERRED EMBODIMENTS

Now, a description will be given in more detail of preferred embodiments of the invention with reference to the accompanying drawings.

(First Embodiment)

Figure 13A:
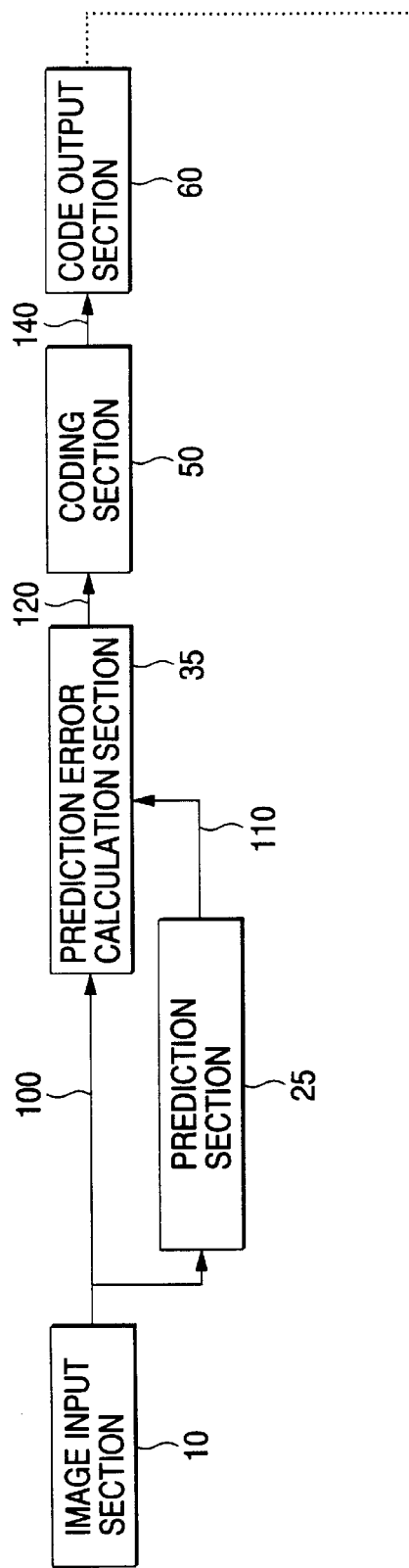
FIGS. 13A and 13B are block diagrams showing an example of a conventional reversible image coding-decoding system.
Figure 13B:
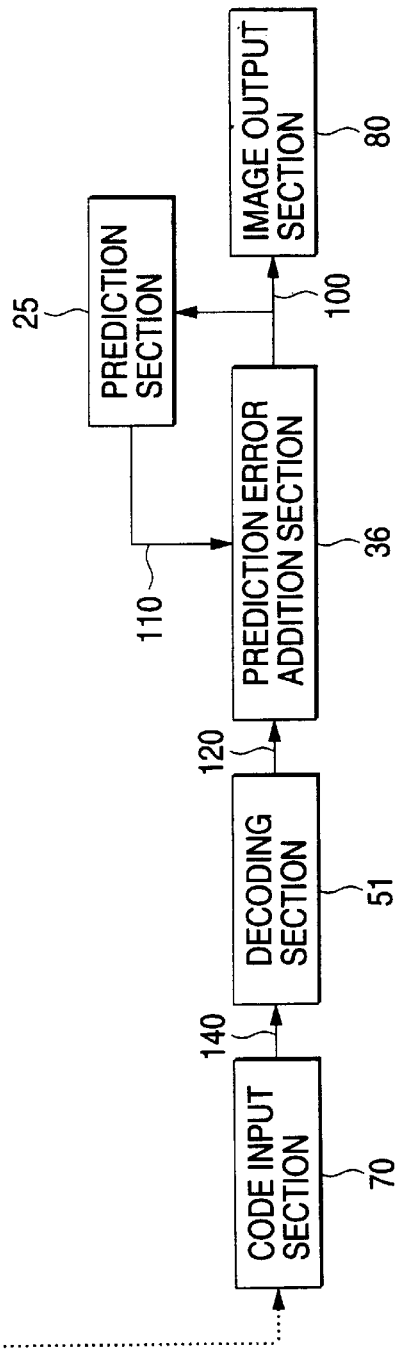

FIGS. 1A and 1B are block diagrams showing an image coding system and an image decoding system of a first embodiment of the invention. Parts identical with or similar to those previously described with reference to FIGS. 13A and 13B are denoted by the same reference numerals in FIGS. 1A and 1B and will not be discussed again. In FIGS. 1A and 1B, numeral 20 is a first prediction section, numeral 21 is a second prediction section, numeral 30 is a prediction error calculation section, numeral 31 is a prediction error addition section, numerals 40 and 41 are selection sections, numeral 111 is control data, and numeral 130 is prediction condition data.

The first prediction section 20 and the second prediction section 21 predict the pixel value of an object pixel based on the image data 100 by predetermined techniques and send the predicted pixel values to the selection section 40 as the predication value data 110. The prediction error calculation section 30 predicts the pixel value of an object pixel based on the image data 100 by a predetermined technique and subtracts the prediction value from the actual pixel value of the object pixel, then sends the subtraction result to the selection section 40 as the prediction error data 120. The selection section 40 detects a prediction match or mismatch in the object pixel from the image data 100 and the prediction value data 110. As a result, if either of the prediction sections makes a right prediction, the selection section 40 converts the identification number of the prediction section into the prediction condition data 130 and sends it to the coding section 50; if both the prediction sections make a wrong prediction, the selection section 40 converts the prediction error data 120 into the prediction condition data 130 and sends it to the coding section 50. If the prediction condition data 130 indicates the identification number of either prediction section, the selection section 41 sends the control data 111 to the corresponding prediction section for causing the prediction section to output the image data 100. If the prediction condition data 130 contains a prediction error, the selection section 41 sends it to the prediction error addition section 31 as the prediction error data 120. The prediction error addition section 31 predicts the pixel value of the object pixel by the same technique as that of the prediction error calculation section 30 and adds the prediction error data 120 to the prediction value, then sends the addition result to the image output section 80 as the image data 100.

FIGS. 2A and 2B are flowcharts to explain the operation of the first embodiment of the image coding-decoding system of the invention. The operation of the first embodiment will be discussed. Parts identical with or similar to those previously described with reference to FIGS. 14A and 14B are denoted by the same reference numerals in FIGS. 2A and 2B and will not be discussed again.

Figure 3A:
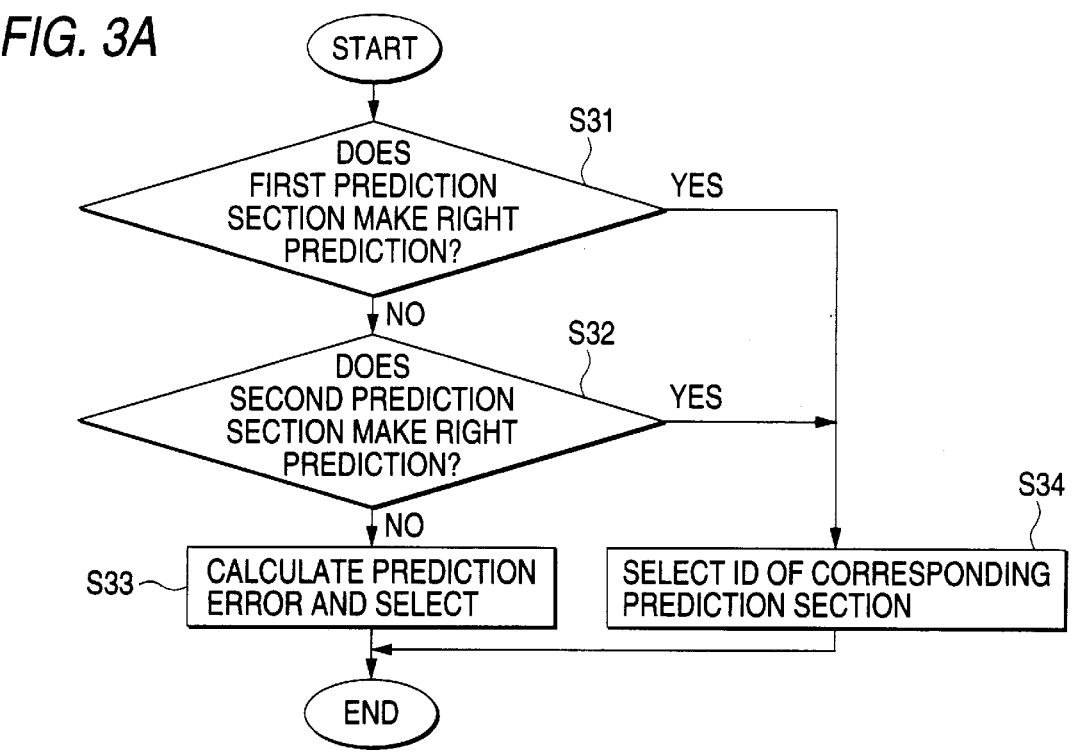
FIGS. 3A and 3B are flowcharts showing an example of the operation of prediction section selection processing in the image coding-decoding system of the first embodiment of the invention.

First, coding processing will be discussed with reference to FIG. 2A. At step S20, the first and second prediction sections 20 and 21 predict the pixel value of an object pixel based on image data 100 and at the same time, the prediction error calculation section 30 calculates a prediction error of a prediction value by a predetermined technique. Step S30 will be discussed with reference to FIG. 3A. At step S31, the selection section 40 determines whether or not the prediction value of the first prediction section matches the pixel value of the object pixel. If they match, control goes to step S34; if they do not match, control goes to step S32. Likewise, at step S32, the selection section 40 determines whether or not the prediction value of the second prediction section matches the pixel value of the object pixel. If they match, control goes to step S34; if they do not match, control goes to step S33. At step S33, the selection section 40 converts prediction error data 120 into prediction condition data 130 and sends the prediction condition data 130 to the coding section 50. At step S34, the selection section 40 converts the identification number of the prediction section making a right prediction into prediction condition data 130 and sends the prediction condition data 130 to the coding section 50.

Figure 3B:
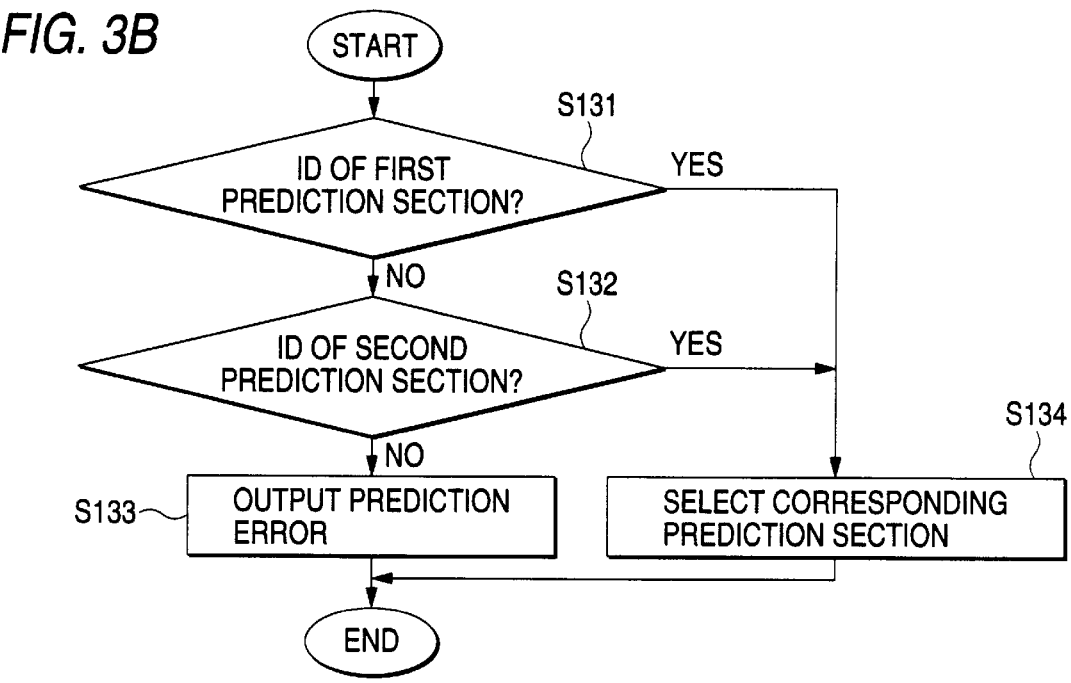

Next, decoding processing will be discussed with reference to FIG. 2B. Step S130 will be discussed with FIG. 3B. At step S131, the selection section 41 determines whether or not the prediction condition data 130 matches the identification number of the first prediction section. If they match, control goes to step S134; if they do not match, control goes to S132. Likewise, at step S132, the selection section 41 determines whether or not the prediction condition data 130 matches the identification number of the second prediction section. If they match, control goes to step S134; if they do not match, control goes to S133. At step S133, the selection section 41 converts the prediction condition data 130 into the prediction error data 120 and sends the prediction error data 120 to the prediction error addition section 31. At step S134, the selection section 40 sends control data 111 to the prediction section having the identification number matching the prediction condition data 130. At step S21, if the prediction section receiving the control data 111 exists, the prediction value of the object pixel predicted by the prediction section is output as image data 100; otherwise, the prediction error addition section 31 adds the prediction error data 120 to the prediction value by the same technique as that of the prediction error calculation section 30 and outputs the addition result as image data 100.

Figure 15:
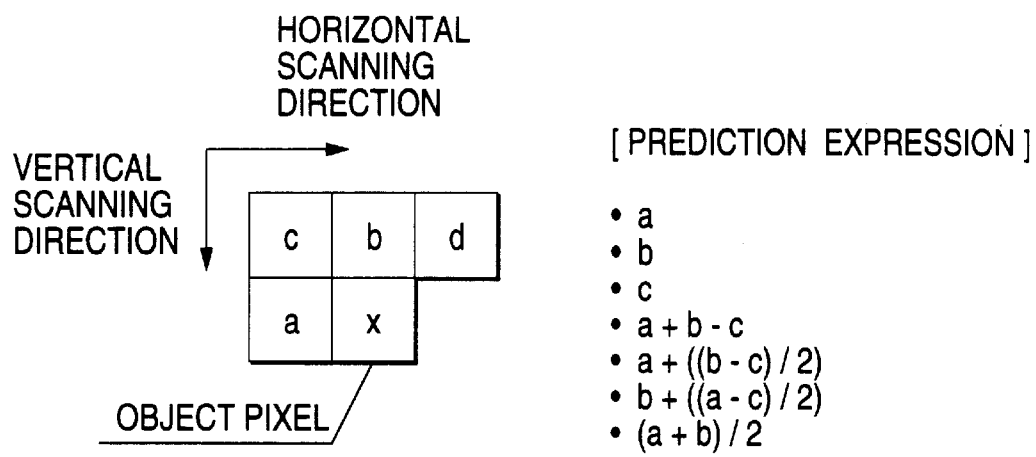
FIG. 15 is an illustration of pixel value prediction expressions in the conventional reversible image coding-decoding system.
Figure 16:
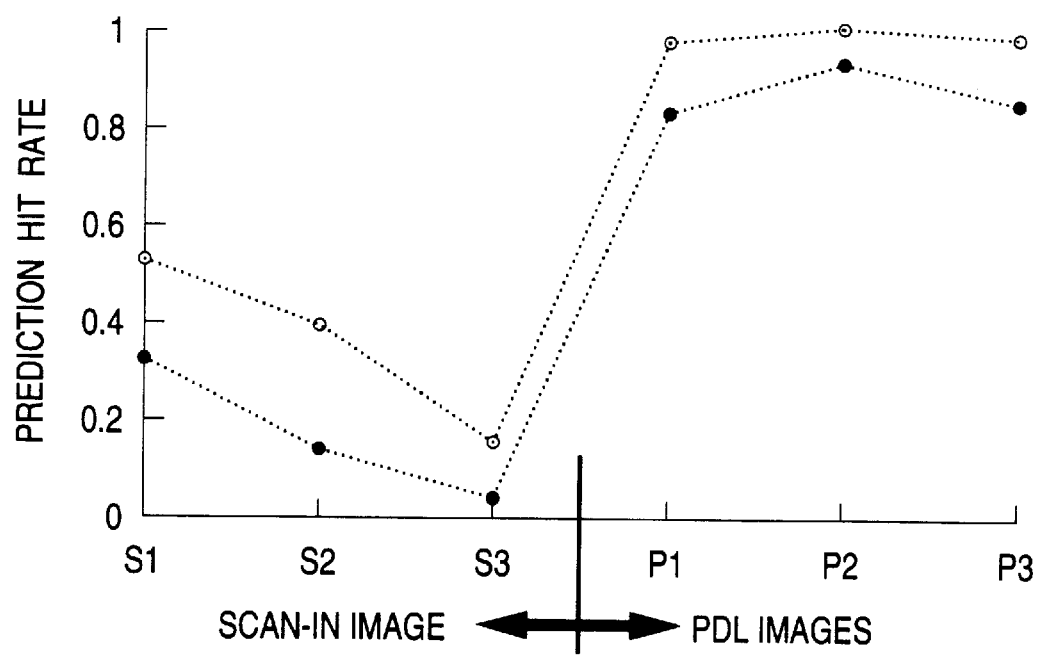
FIG. 16 is an illustration for explaining the relationship between pixel value predictions and image types in the conventional reversible image coding-decoding system.
Figure 17:
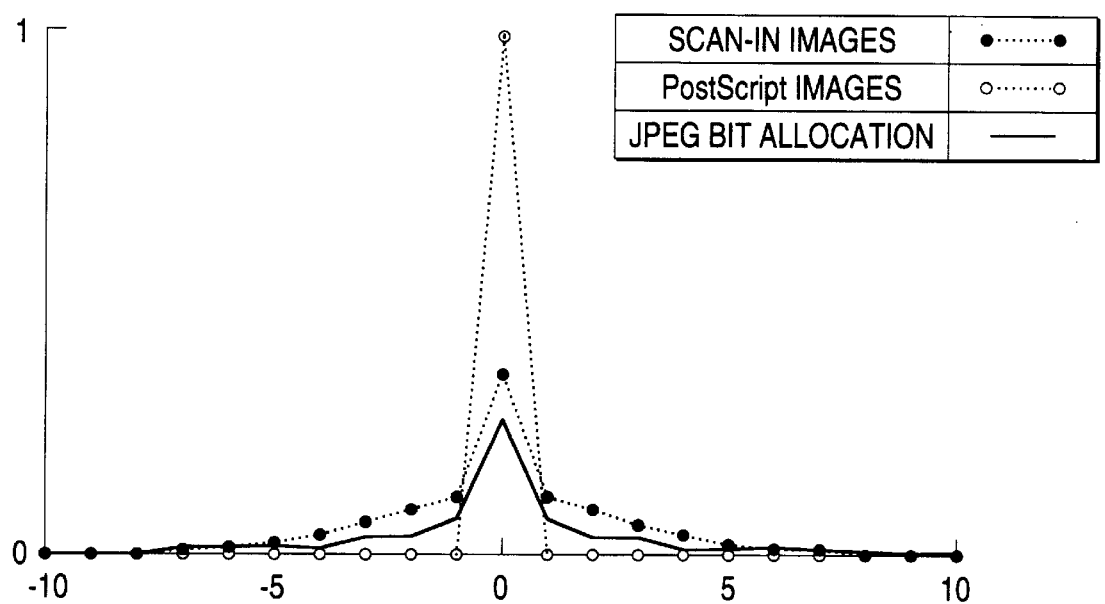
FIG. 17 is an illustration for explaining the relationship between pixel value predictions and image types in the conventional reversible image coding-decoding system.

The prediction techniques used with the first prediction section 20, the second prediction section 21, the prediction error calculation section 30, and the prediction error addition section 31 are not limited if they are prediction techniques using processed pixel values. They may be not only the linear expressions as shown in FIG. 15, but also prediction expressions taking a median value of referenced pixels, for example. However, in view of the CG image features described above, predictions with peripheral pixel values themselves (for example, prediction expressions a, b, c, and d in FIG. 15) are considered effective.

The prediction error calculation section 30 and the prediction error addition section 31 may use the same prediction technique as either of the first and second prediction sections 20 and 21. For example, either one output of the prediction sections may be input to the prediction error calculation section 30, the prediction error addition section 31. In doing so, the system can be simplified.

We have discussed the example using two prediction techniques, but three or more prediction sections may be provided. Likewise, to provide more than one prediction error calculation section 30 and more than one prediction error addition section 31, they can be implemented in a similar configuration.

Although we have discussed the sequential operation for convenience, parallel processing may be performed. For example, step S10 at which image data is input and step S20 (prediction process) can be performed in parallel. Alternatively, in decoding processing, step S21 (prediction process) may be executed preceding or in parallel with step S130 at which a prediction section is selected and at step S130, the result of step S21 may be selected. The essence of invention does not depend on the order of these steps.

FIGS. 4A to 4E show examples of the prediction condition data 130 and the code data 140. The prediction condition data contains the identification number of the prediction section whose prediction matches the actual pixel value or a prediction error. Therefore, for example, the format as shown in FIG. 4A is possible. Now, representing the identification numbers of the first and second prediction sections as 1 and 2 and a wrong prediction as 0, an example as in FIG. 4B is given.

The data is coded by the coding section 50. If fixed-length code is given for the purpose of high-speed decoding, etc., the data becomes as shown in FIG. 4C, for example. Here, 1→01, 2→10, wrong prediction→00 and the prediction error is represented by a sign plus 8-bit binary number. To improve the compression rate, variable-length coding such as Huffman coding or arithmetic coding is used. For example, for Huffman code giving a 1-bit code to the first prediction section which seems to be high in occurrence rate, code data in FIG. 4D is provided if 1→0, 2→10, wrong prediction→11. In the example in FIG. 4D, JPEG Huffman code is also used for prediction errors. However, the JPEG code is not optimum for CG images, as described above. If design is again made from statistical values, furthermore efficient code can be prepared. The fact that the prediction hit rate is high can also be used to take run data of the first prediction section for the data in FIG. 4D, for example. This example is shown in FIG. 4E. Alternatively, arithmetic coding comprising multivalue-binary value conversion like JPEG (not shown) may be used. Thus, several coding techniques are possible.

FIGS. 5A and 5B are block diagrams to take run data of the first prediction section as an example. Parts identical with or similar to those previously described with reference to FIGS. 1A and 1B are denoted by the same reference numerals in FIGS. 5A and 5B and will not be discussed again. In FIG. 5A and 5B, numeral 70 is a run count section, numeral 150 is prediction condition data, and numeral 160 is run data. If the prediction condition data 150 points to a first prediction section, the run count section 70 increments an internal counter by one. If the prediction condition data 150 points to any other than the first prediction section and the internal counter is not 0, the run count section 70 sends the value of the internal counter to a coding section 50 as run data 160. The coding section 50 performs the operation slightly different from that of the coding section 50 in FIGS. 1A and 1B. If the run data 160 and prediction condition data 130 are given at the same time, the coding section 50 first codes the run data 160, then the prediction condition data 130. If only the prediction condition data 130 is given, the coding section 50 performs the operation similar to that of the coding section 50 in FIGS. 1A and 1B. The operation of a decoding system will not be discussed here because similar change is only made.

(Second Embodiment)

FIGS. 6A and 6B are block diagrams showing an image coding-decoding system according to a second embodiment of the invention. Parts identical with or similar to those previously described with reference to FIGS. 1A and 1B are denoted by the same reference numerals in FIGS. 6A and 6B and will not be discussed again. In FIGS. 6A and 6B, numeral 22 is a third prediction section, numeral 200 is a prediction section order determination section, numeral 300 is prediction section order data, and numeral 310 is prediction result data.

Like first and second prediction sections 20 and 21, the third prediction section 22 predicts the pixel value of an object pixel based on image data 100 by a predetermined technique and sends the predicted pixel value to a selection section 40 as prediction value data 110. The prediction section order determination section 200 orders the prediction sections so as to assign the high order to the prediction section which seems to be high in reliability, based on prediction result data 310, etc., and sends the result to the selection section 40 as prediction section order data 300.

The selection section 40 differs from the selection section 40 in the first embodiment except that when any of the prediction sections makes a right prediction, it converts the order based on the prediction section order data 300 rather than the identification number of the corresponding prediction section into prediction condition data 130. Likewise, a selection section 41 in decoding system converts the order obtained from the prediction condition data 130 into the identification number of the prediction section based on the prediction section order data 300, then sends control data 111 to the corresponding prediction section.

Figure 7:
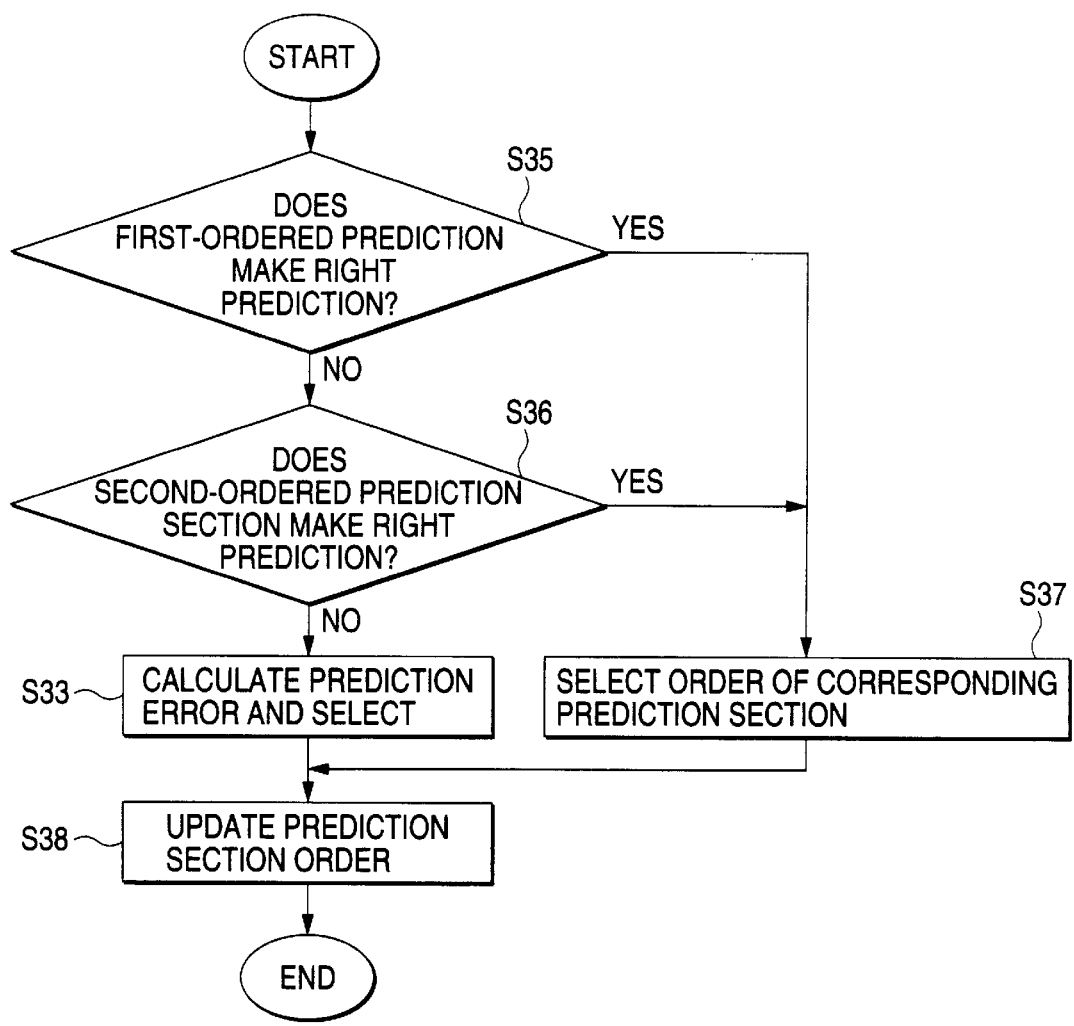
FIG. 7 is a flowchart to show an example of the operation of prediction section selection processing in the image coding-decoding system of the second embodiment of the invention.

Next, the operation of the second embodiment will be discussed. It is almost the same as the operation of the first embodiment in FIGS. 2A and 2B. Step S30 in FIGS. 2A and 2B will be discussed. FIGS. 6A, 6B and 7 show flowcharts for explaining the operation at step S30 in the second embodiment.

First, coding processing will be discussed. At step S35, the selection section 40 uses the prediction section order data 300 to find the prediction value of the first-ordered prediction section and compares the prediction value with the actual pixel value of the object pixel for determining whether or not they match. If they match, control goes to step S38; if they do not match, control goes to step S36. Likewise, at step S36, the selection section 40 uses the prediction section order data 300 to find the prediction value of the second-ordered prediction section and compares the prediction value with the actual pixel value of the object pixel for determining whether or not they match. If they match, control goes to step S38; if they do not match, control goes to step S37. Step S33 is the same as that in the first embodiment. At step S37, the selection section 40 converts the prediction section order of the prediction section making the right prediction into prediction condition data 130 and sends the prediction condition data 130 to a coding section 50. At step S38, the selection section 40 sends the match conditions in predictions of the prediction sections as prediction result data 310. The prediction section order determination section 200 uses the prediction result data 310 to update the prediction section order.

Figure 8:
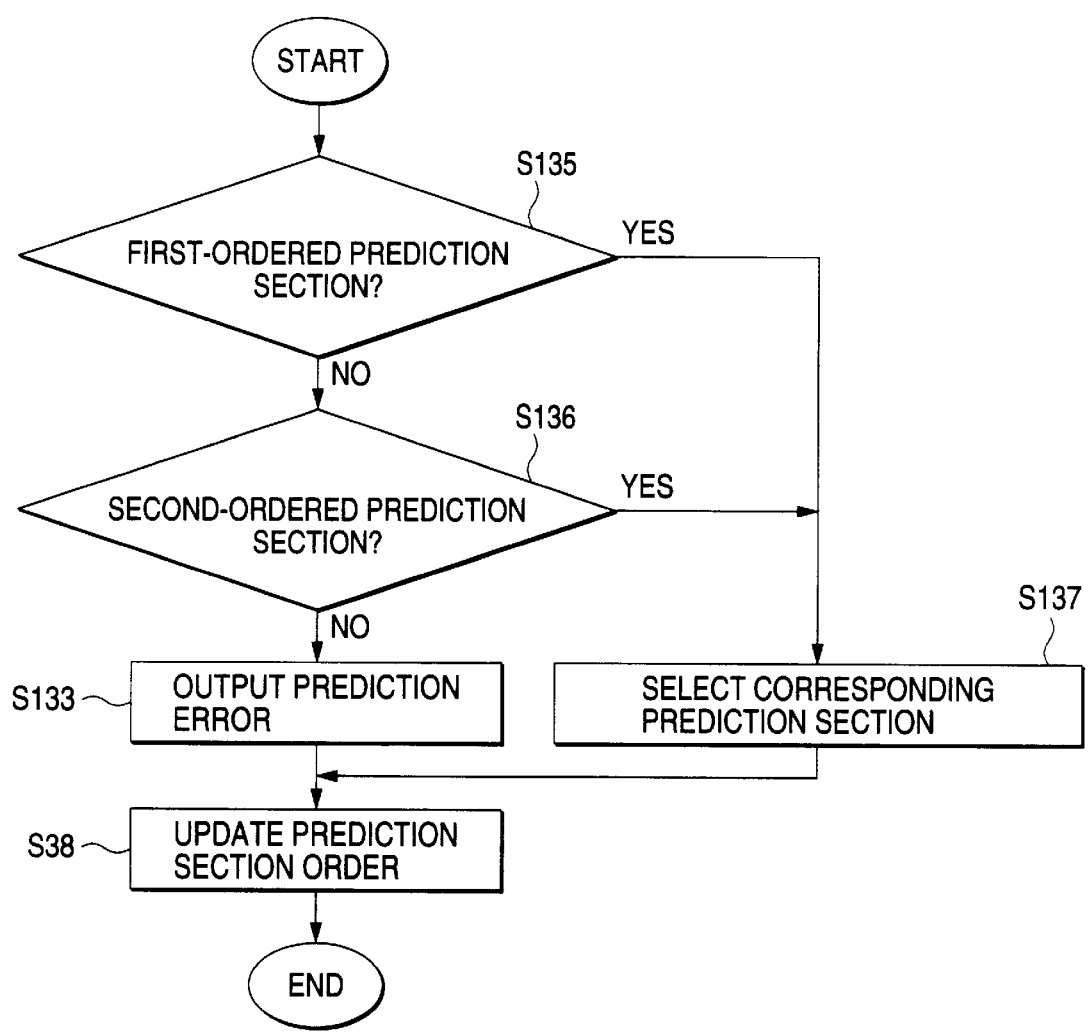
FIG. 8 is a flowchart showing an example of the operation of prediction section selection processing in the image coding-decoding system of the second embodiment of the invention.

Next, decoding processing will be discussed with reference to FIG. 8. At step S135, the selection section 41 determines whether or not the prediction condition data 130 indicates the right prediction of the first-ordered prediction section. If the first-ordered prediction section is indicated, control goes to step S137; otherwise, control goes to step S136. Likewise, at step S136, the selection section 41 determines whether or not the prediction condition data 130 indicates the right prediction of the second-ordered prediction section. If the second-ordered prediction section is indicated, control goes to step S137; otherwise, control goes to step S138. Step S133 is the same as the that in the first embodiment. At step S137, the prediction section corresponding to the prediction section order indicated by the prediction condition data 130 is found based on the prediction section order data 300 and the prediction value of the found prediction section is output as image data 100. The subsequent step is the same as that of the coding processing and will not be discussed again.

In the operation, prediction section ordering is determined by the statistic values including the number of times a right prediction has been made, and average, variance, etc., using absolute values or square values of prediction errors. It may be changed in response to peripheral pixel values prediction sections making right predictions at peripheral pixels as use of context in arithmetic coding. For example, an ordering table can be changed in response to a pixel value distribution of peripheral pixels. Prediction section ordering may also be updated at appropriate intervals, for example, every line. In this case, processing can be simplified.

FIGS. 9A to 9D are a conceptual drawing of a memory in the prediction section order determination section 200 when the ordering criterion is the sum of the absolute values of prediction errors, and conceptual drawings of the prediction section order data 300 and the prediction result data 310 at the time. The prediction section order determination section 200 stores the prediction results for processed pixels for each prediction section and uses the result values to determine the prediction order. In the example in FIG. 9A, the prediction section with the smallest sum of the absolute values of errors is assigned to the first prediction order. The ordering result is sent to the election sections 40 and 41 as the prediction section order data 300 as shown in FIG. 9B.

At the end of coding an object pixel, the prediction order is updated for coding the next pixel. Prediction result data 310 is sent from the selection sections 40 and 41. An example of the prediction result data 310 is shown in FIG. 9C. Here, it is shown as the relationship between the prediction sections and prediction errors, but may be in the format indicating the relationship between the prediction order and prediction errors. FIG. 9D shows the updated result of the internal memory of the prediction section order determination section 200 by using the result in FIG. 9C. In the example, since the prediction error of the first prediction section is larger than that of the second prediction section, the prediction order is changed between the first and second prediction sections.

Only the sums of the absolute values of prediction errors are stored in FIGS. 9A and 9D. However, if they are stored as a history of prediction errors for each pixel, the older data can also be erased in order. In addition, whenever data is updated, the stored values can also be multiplied by a constant of less than one for decreasing the weight of older data on average.

Figure 10:
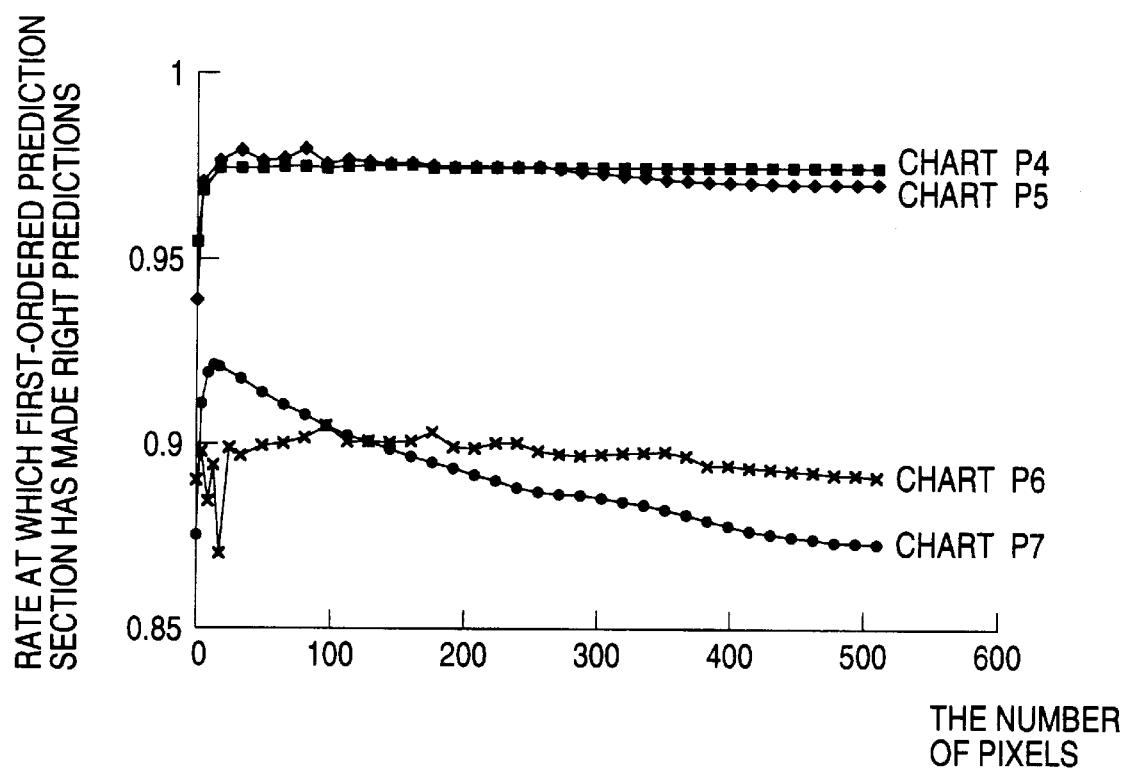
FIG. 10 is a graph showing experiment data of the relationship between the statistic range used for ordering prediction sections and order hit rate in the image coding-decoding system of the second embodiment of the invention.

Here, the statistic range for ordering will be considered. If the range in which statistics are taken for ordering is widened, the whole trend can be known, but it becomes hard to follow local change. In contrast, if the statistic taking range for ordering is narrow, the number of samples lessens and a problem arises in statistic reliability. FIG. 10 shows the experiment results for the statistic range. Here, the ordering criterion is the number of times a right prediction has been made. The horizontal axis of the graph is the number of pixels in the statistic range and the vertical axis is the rate at which the first-ordered prediction section has made right predictions. FIG. 10 indicates that charts except P4 show a trend lowering toward the right end; the possible reason why the charts show the trend is that if the statistic range is taken too large, it becomes impossible to follow local nature change of an image. Thus, it may be proper to take statistics of about 20 to 50 pixels.

Another example of ordering the prediction sections will be discussed wherein the most recently selected prediction section is assigned the first order. Now, assume that four prediction sections are provided and that the prediction order is assigned to the first to fourth prediction sections from high to low. At this time, if the third prediction is selected, when the next pixel is coded, the first prediction order is assigned to the third prediction section as third→first →second→fourth prediction section.

Change processing can be carried out by using a table in FIG. 11, for example. When the number of prediction sections is four, the number of prediction order patterns is 4!=24. The prediction order patterns are assigned unique pattern numbers. Table input is a selected prediction section and output is a prediction order pattern. Now, assume that the pattern number is 0. At this time, the prediction order pattern is first→second→third→fourth. Assume that the third prediction section is selected. Then, the next pattern number becomes 12 described under the column "next prediction order pattern No."="third" on the row "prediction order pattern number"="0" in the table. As a result, the prediction order pattern corresponding to pattern number 12, third→first→second→fourth, is provided as the next prediction order pattern.

At this time, it is also possible to contain statistic elements in the prediction order pattern transition. For example, in FIG. 11, when the pattern number is 0, if the first prediction section is selected, the next pattern number again becomes 0. However, considering statistically, it is natural to assign the first prediction section the higher priority order because the first prediction section is again selected. As an example, a new pattern number $x$ with "prediction order pattern" first→second→third→fourth and "next prediction order pattern number" $x$, 0, 0, 0 can be added to the table in FIG. 11 for changing so as to make the transition to the pattern number $x$ if the first prediction section is selected when the pattern number is 0.

As a modification of the embodiment, prediction ordering may also be applied to "prediction error coding." In other words, a prediction part of "all predictions are wrong" is added, whereby adaptive change of code corresponding to a prediction error is enabled, so that the compression rate can be improved.

The prediction order can also be changed more easily. For example, the prediction order of prediction sections other than the first-ordered prediction section may conform to predetermined priorities. Assume that the priority order is first>second>third>fourth. If the second prediction section is used, regardless of the previous order, the prediction order become>second>first>third>fourth; if the third prediction section is used, the prediction order become>third>first>second>fourth, and so forth on, whereby the number of prediction order patterns becomes the same as the number of prediction sections and processing is facilitated.

By the way, the second embodiment uses only two high-ordered ones of the three prediction sections, but any number of prediction sections may be provided (if the number of candidate prediction sections is two or more) and (if the number of actually used prediction sections is one or more and is equal to or less than the number of candidate prediction sections.) Limiting selected prediction sections to the high-ordered ones is effective for reducing code overhead occurring when the number of prediction sections is increased. For example, if the coding section 50 attempts to execute Huffman coding, the longest code becomes log2 (number of prediction sections) bits or more. However, if the selected prediction sections are limited to the first-ordered to fourth-ordered prediction sections, two bits are only required. If some prediction sections predict the same value, the lower-ordered prediction section may be omitted and the subsequent prediction sections may be moved up.

Figure 12:
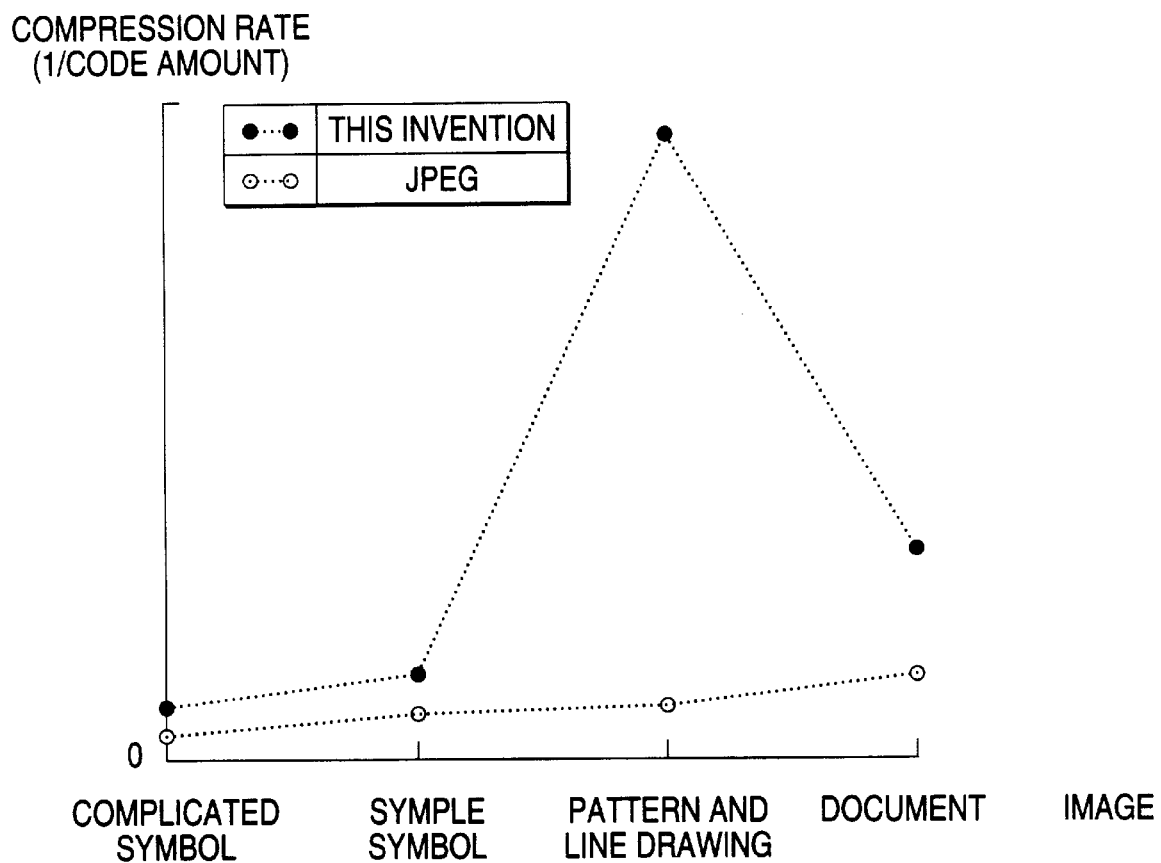
FIG. 12 is a graph to show the PDL image coding experiment results of the image coding-decoding system of the second embodiment of the invention and JPEG.

FIG. 12 shows the PostScript image coding result using the second embodiment to verify the effects of the invention. The JPEG coding result is also shown for comparison. From FIG. 12, the effects of the invention are obvious.

As we have discussed, according to the invention, the prediction section making a right prediction among the prediction sections is used for coding, thus images high in prediction hit rate like CG images can be coded at a high compression rate. Particularly, if the identification number of a prediction section is coded, processing and the system can be simplified and speeded up. To code the prediction section order rather than the prediction section identification number, code can be adaptively assigned to the prediction sections, so that the compression rate can be made higher. At this time, ordering can also be performed for prediction error coding for furthermore improving the compression rate. processing can be simplified and speeded up by using the number of times a right prediction has been made for ordering. Importance is attributed to the more recent prediction error condition in ordering, whereby image nature change is easily followed, so that the compression rate can be furthermore improved. The prediction sections used for coding are limited to the high-order prediction sections, whereby the number of prediction sections can be increased without code overhead and the compression rate and adaptability to various images are improved. The number of times the prediction section has been consecutively selected is coded, thereby providing a higher compression rate particularly in images high in prediction hit rate, etc.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image coding system comprising:

means for inputting an image;

a plurality of pixel value prediction means for predicting a pixel value of an object pixel to be coded in the image input through said image input means by different prediction techniques;

prediction error calculation means for calculating an error between the pixel value of an object pixel to be coded in the image input through said image input means and a prediction value predicted by a predetermined prediction technique;

match determination means being responsive to the calculation result of said prediction error calculation means for determining whether or not the pixel value predicted by each of said pixel value prediction means matches the pixel value of the object pixel;

selection means being responsive to determination output of said match determination means for selecting identification information for identifying the pixel value prediction means whose prediction pixel value is determined to match the pixel value of the object pixel by said match determination means or the error calculated by said prediction error calculation means;

means for coding the identification information or error output by said selection means; and means for outputting code generated by said coding means.

2. The image coding system as claimed in claim 1 further comprising prediction order determination means for ordering said plurality of pixel value prediction means based on a history of predictions made by said plurality of pixel value prediction means, wherein said selection means outputs the identification information of said pixel value prediction means represented by the order assigned by said prediction order determination means.

3. The image coding system as claimed in claim 2 wherein said prediction order determination means orders said plurality of pixel value prediction means based on the number of times each of said pixel value prediction means has made a right prediction.

4. The image coding system as claimed in claim 2 wherein said prediction order determination means orders said plurality of pixel value prediction means based on a history of right predictions made by said plurality of pixel value prediction means within a recent predetermined period.

5. The image coding system as claimed in claim 2 wherein only when the pixel value prediction means whose prediction pixel value matches the pixel value of the object pixel is assigned a predetermined high-number order by said prediction order determination means, said selection means selects the identification information of said pixel value prediction means, and wherein when the pixel value prediction means whose prediction pixel value matches the pixel value of the object pixel is assigned an order lower than the predetermined high-number order by said prediction order determination means, said selection means selects the error calculated by said prediction error calculation means.

6. The image coding system as claimed in claim 2 wherein said coding means performs coding based on the number of times of identification information selected consecutively by said selection means.

7. The image coding system as claimed in claim 1 further comprising prediction order determination means for ordering said plurality of pixel value prediction means and said prediction error calculation means based on a history of predictions made by said plurality of pixel value prediction means;
   wherein said selection means outputs the identification information of said pixel value prediction means and said prediction error calculation means represented by the order assigned by said prediction order determination means.

8. The image coding system as claimed in claim 7 wherein said prediction order determination means orders said plurality of pixel value prediction means based on the number of times each of said pixel value prediction means has made a right prediction.

9. The image coding system as claimed in claim 7 wherein said prediction order determination means orders said plurality of pixel value prediction means based on a history of right predictions made by said plurality of pixel value prediction means within a recent predetermined period.

10. The image coding system as claimed in claim 7 wherein only when the pixel value prediction means whose prediction pixel value matches the pixel value of the object pixel is assigned a predetermined high-number order by said prediction order determination means, said selection means selects the identification information of said pixel value prediction means; and
   wherein when the pixel value prediction means whose prediction pixel value matches the pixel value of the object pixel is assigned an order lower than the predetermined high-number order by said prediction order determination means, said selection means selects the error calculated by said prediction error calculation means.

11. The image coding system as claimed in claim 7 wherein said coding means performs coding based on the number of times of identification information selected consecutively by said selection means.

12. The image coding system as claimed in claim 1 wherein said coding means performs coding based on the number of times of identification information selected consecutively by said selection means.

13. An image decoding system comprising:
   means for inputting code generated by a image coding system that comprises:
      means for inputting an image;
      a plurality of pixel value prediction means for predicting a pixel value of an object pixel to be coded in the image input through said image input means by different prediction techniques;
      prediction error calculation means for calculating an error between the pixel value of an object pixel to be coded in the image input through said image input means and a prediction value predicted by a predetermined prediction technique;
      match determination means being responsive to the calculation result of said prediction error calculation means for determining whether or not the pixel value predicted by each of said pixel value prediction means matches the pixel value of the object pixel;
      selection means being responsive to determination output of said match determination means for selecting identification information for identifying the pixel value prediction means whose prediction pixel value is determined to match the pixel value of the object pixel by said match determination means or the error calculated by said prediction error calculation means;
      means for coding the identification information or error output by said selection means; and
      means for outputting code generated by said coding means;
   means for decoding the code input through said code input means;
   a plurality of pixel value prediction means for predicting a pixel value of an object pixel to be decoded in an image by different prediction techniques, thereby calculating the pixel value of the object pixel;
   prediction error addition means for adding an error decoded by said decoding means and a prediction value predicted by a predetermined prediction technique, thereby calculating the pixel value of the object pixel in the image;
   selection means being responsive to information decoded by said decoding means for selecting any of said plurality of pixel value prediction means or said prediction error addition means; and
   object pixel output means, if one of said plurality of pixel value prediction means is selected by said selection means, for outputting the pixel value of the object pixel calculated by the selected pixel value prediction means, if said prediction error addition means is selected by said selection means, for outputting the pixel value of the object pixel calculated by the selected prediction error addition means.

14. The image decoding system as claimed in claim 13 further including prediction order determination means for ordering said plurality of pixel value prediction means based on a history of predictions made by said plurality of pixel value prediction means;
   wherein said selection means being responsive to the identification information of said pixel value prediction means represented by the order assigned by said prediction order determination means for selecting said pixel value prediction means.

15. The image decoding system as claimed in claim 14 wherein said prediction order determination means orders said plurality of pixel value prediction means based on the number of times each of said pixel value prediction means has made a right prediction.

16. The image decoding system as claimed in claim 14 wherein said prediction order determination means orders said plurality of pixel value prediction means based on a history of right predictions made by said plurality of pixel value prediction means within a recent predetermined period.

17. The image decoding system as claimed in claim 14 wherein said selection means selects means based on only a predetermined high-number order after ordering is performed by said prediction order determination means.

18. The image decoding system as claimed in claim 14 wherein the code input through said code input means is provided by coding the number of times the pixel value prediction means has been consecutively selected by said selection means.

19. The image decoding system as claimed in claim 13 further including prediction order determination means for ordering said plurality of pixel value prediction means and said prediction error calculation means based on a history of predictions made by said plurality of pixel value prediction means;

wherein said selection means being responsive to the identification information of said pixel value prediction means and said prediction error calculation means represented by the order assigned by said prediction order determination means for selecting said pixel value prediction means or said prediction error calculation means.

20. The image decoding system as claimed in claim 19 wherein said prediction order determination means orders said plurality of pixel value prediction means based on the number of times each of said pixel value prediction means has made a right prediction.

21. The image decoding system as claimed in claim 19 wherein said prediction order determination means orders said plurality of pixel value prediction means based on a history of right predictions made by said plurality of pixel value prediction means within a recent predetermined period.

22. The image decoding system as claimed in claim 19 wherein said selection means selects means based on only a predetermined high-number order after ordering is performed by said prediction order determination means.

23. The image decoding system as claimed in claim 19 wherein the code input through said code input means is provided by coding the number of times the pixel value prediction means has been consecutively selected by said selection means.

24. The image decoding system as claimed in claim 13 wherein the code input through said code input means is provided by coding the number of times the pixel value prediction means has been consecutively selected by said selection means.

25. An image coding-decoding system comprising:

means for inputting an image;

a plurality of coding pixel value prediction means for predicting a pixel value of an object pixel to be coded in the image input through said image input means by different prediction techniques;

prediction error calculation means for calculating an error between the pixel value of an object pixel to be coded in the image input through said image input means and a prediction value predicted by a predetermined prediction technique;

match determination means being responsive to the calculation result of said prediction error calculation means for determining whether or not the pixel value predicted by each of said coding pixel value prediction means matches the pixel value of the object pixel;

coding selection means being responsive to determination output of said match determination means for selecting identification information for identifying the coding pixel value prediction means whose prediction pixel value is determined to match the pixel value of the object pixel by said match determination means or the error calculated by said prediction error calculation means;

means for coding the identification information or error output by said coding selection means;

means for outputting code generated by said coding means;

means for storing the code output by said output means;

means for inputting the code stored in said storage means;

means for decoding the code input through said code input means;

a plurality of decoding pixel value prediction means for predicting a pixel value of an object pixel to be decoded in an image by different prediction techniques, thereby calculating the pixel value of the object pixel;

prediction error addition means for adding an error decoded by said decoding means and a prediction value predicted by a predetermined prediction technique, thereby calculating the pixel value of the object pixel in the image;

selection means being responsive to identification information and an error decoded by said decoding means for selecting any of said plurality of decoding pixel value prediction means or said prediction error addition means; and object pixel output means, if one of said plurality of decoding pixel value prediction means is selected by said decoding selection means, for outputting the pixel value of the object pixel calculated by the selected decoding pixel value prediction means, if said prediction error addition means is selected by said decoding selection means, for outputting the pixel value of the object pixel calculated by the selected prediction error addition means.

* * * * *